(12) United States Patent
Dykstra et al.

(10) Patent No.: US 10,550,683 B2
(45) Date of Patent: Feb. 4, 2020

(54) REMOVAL OF STICK-SLIP VIBRATIONS IN A DRILLING ASSEMBLY

(71) Applicant: Halliburton Energy Services, Inc., Houston, TX (US)

(72) Inventors: Jason D. Dykstra, Carrollton, TX (US); Fanping Bu, Carrollton, TX (US); Yuzhen Xue, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 389 days.

(21) Appl. No.: 14/912,087

(22) PCT Filed: Sep. 17, 2013

(86) PCT No.: PCT/US2013/060162
§ 371 (c)(1),
(2) Date: Feb. 13, 2016

(87) PCT Pub. No.: WO2015/041630
PCT Pub. Date: Mar. 26, 2015

(65) Prior Publication Data
US 2016/0194946 A1    Jul. 7, 2016

(51) Int. Cl.
*E21B 44/04* (2006.01)
*E21B 3/00* (2006.01)
(Continued)

(52) U.S. Cl.
CPC ............... *E21B 44/04* (2013.01); *E21B 3/00* (2013.01); *E21B 47/0006* (2013.01); *G05B 13/0265* (2013.01)

(58) Field of Classification Search
CPC . E21B 3/00; E21B 44/00; E21B 44/04; E21B 47/006; E21B 47/06; E21B 47/0006; G05B 13/0265
See application file for complete search history.

(56) References Cited

U.S. PATENT DOCUMENTS 3,590,940 A * 7/1971 Leger ................... E21B 47/082
                                                                181/104
5,852,235 A * 12/1998 Pavone .................. E21B 44/00
                                                                73/152.45
(Continued)

FOREIGN PATENT DOCUMENTS

CN          1059180 A     3/1992
CN          2654840 Y    11/2004
(Continued)

OTHER PUBLICATIONS

Office Action issued in related RU Application No. 2016100980, dated Jun. 2, 2017 (7 pages).
(Continued)

*Primary Examiner* — Robert E Fuller
*Assistant Examiner* — Christopher J Sebesta
(74) *Attorney, Agent, or Firm* — Alan Bryson; Baker Botts L.L.P.

(57) ABSTRACT

An example method for removal of stick-slip vibrations may comprise receiving a command directed to a controllable element of a drilling assembly. A smooth trajectory profile may be generated based, at least in part, on the command. A frictional torque value for a drill bit of the drilling assembly may be determined. The example method may further include generating a control signal based, at least in part, on the trajectory profile, the frictional torque value, and a model of the drilling assembly, and transmitting the control signal to the controllable element.

20 Claims, 8 Drawing Sheets

(51) Int. Cl.
*E21B 47/00* (2012.01)
*G05B 13/02* (2006.01)

(56) References Cited

U.S. PATENT DOCUMENTS

| | | | | |
|---|---|---|---|---|
| 2008/0135290 | A1* | 6/2008 | Hopwood | E21B 44/00 175/24 |
| 2008/0156531 | A1* | 7/2008 | Boone | E21B 7/06 175/27 |
| 2011/0077924 | A1 | 3/2011 | Ertas et al. | |
| 2011/0280104 | A1* | 11/2011 | McClung, III | E21B 3/02 367/82 |
| 2012/0130693 | A1* | 5/2012 | Ertas | E21B 44/00 703/2 |
| 2012/0228028 | A1 | 9/2012 | Turner et al. | |
| 2012/0255778 | A1 | 10/2012 | Reckmann et al. | |
| 2013/0049982 | A1 | 2/2013 | Hartmann | |
| 2013/0092439 | A1 | 4/2013 | Mauldin et al. | |
| 2013/0124095 | A1 | 5/2013 | Sugiura | |
| 2014/0318865 | A1* | 10/2014 | Doris | E21B 44/00 175/40 |

FOREIGN PATENT DOCUMENTS

| | | |
|---|---|---|
| CN | 201620771 U | 11/2010 |
| CN | 102979490 A | 3/2013 |
| EP | 1867829 A1 | 12/2007 |
| RU | 2108456 C1 | 4/1998 |
| RU | 2478781 C2 | 4/2013 |
| WO | 2010/064031 A1 | 6/2010 |
| WO | 2013/076184 A2 | 5/2013 |

OTHER PUBLICATIONS

Office Action issued in related Chinese Application No. 201380078202.1, dated Aug. 3, 2016 (30 pages).
International Preliminary Report on Patentability issued in related PCT Application No. PCT/US2013/060162, dated Mar. 31, 2016, 14 pages.
Halsey, G.W. et al., "Torque Feedback Used to Cure Slip-Stick Motion", SPE Paper 18049-MS, SPE Annual Technical Conference and Exhibition, Oct. 2-5, Houston, Texas, 1988.
International Search Report and Written Opinion issued in related PCT Application No. PCT/US2013/060162 dated Jun. 19, 2014, 17 pages.

\* cited by examiner

REMOVAL OF STICK-SLIP VIBRATIONS IN A DRILLING ASSEMBLY

CROSS-REFERENCE TO RELATED APPLICATION

The present application is a U.S. National Stage Application of International Application No. PCT/US2013/060162 filed Sep. 17, 2013, which is incorporated herein by reference in its entirety for all purposes.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Subterranean drilling apparatuses such as drill bits, drill strings, bottom-hole assemblies (BHAs), and/or downhole tools may contact the borehole wall in such a way that they become caught or lodged in the borehole wall, causing the drill string to "stick." When the drilling apparatus "sticks," the rotational movement of the drill string is either stopped or severely decreased. Torque is still imparted to the drill string at the surface, despite the drilling apparatus being stuck, causing the drill string to twist. Once the torque applied to the drill string overcomes the force of static friction on the drilling apparatus, the drill string "slips" or releases from the borehole wall. This phenomenon can decrease the lifespan of downhole components, decrease the quality of the borehole, and delay the drilling operation.

FIGURES

Some specific exemplary embodiments of the disclosure may be understood by referring, in part, to the following description and the accompanying drawings.

Figure 1:
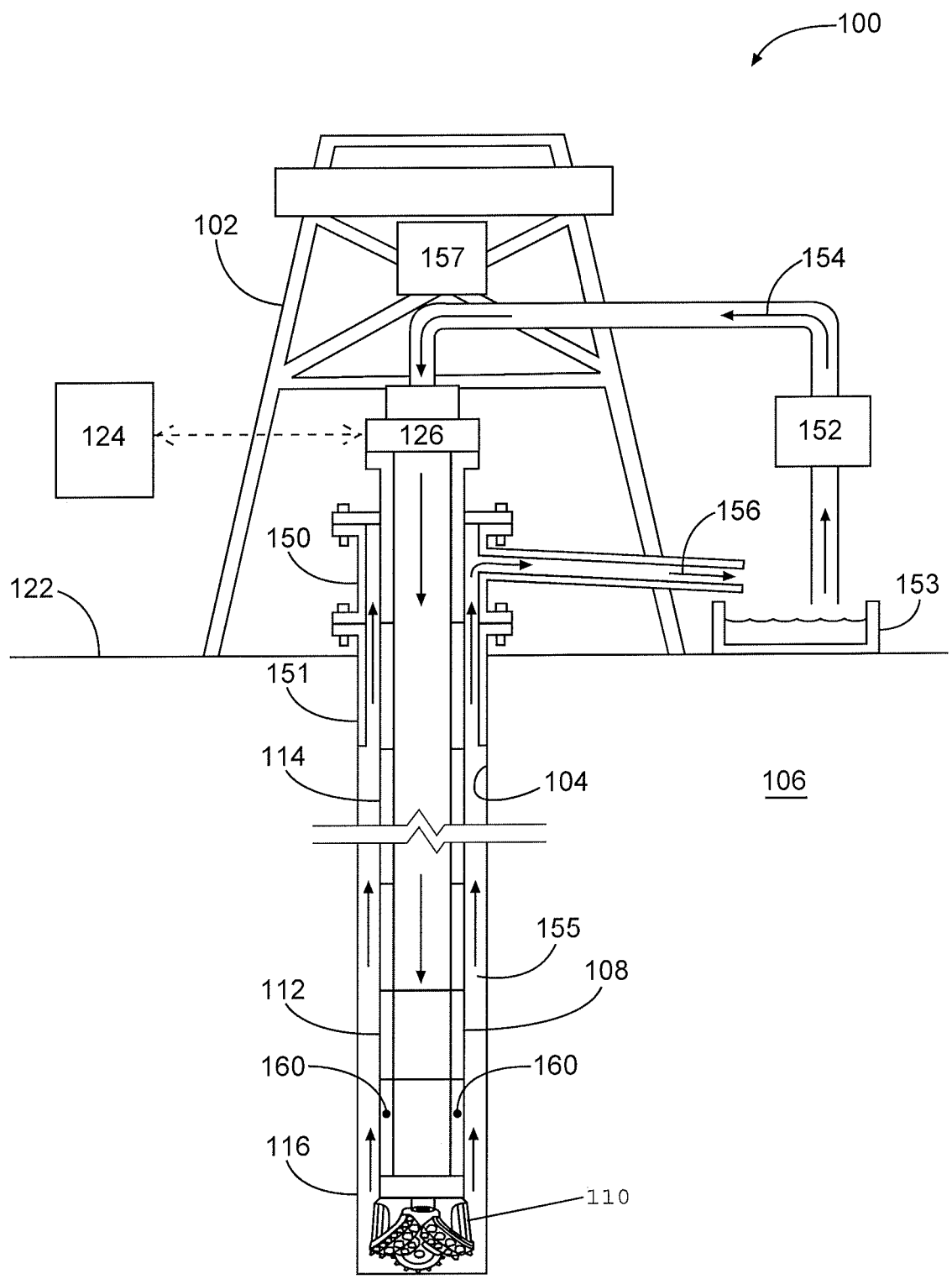
FIG. 1 is a diagram of an example drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

FIG. 1 is a diagram of an example drilling system 100, according to aspects of the present disclosure. The drilling system 100 may include a rig 102 mounted at the surface 122, positioned above a borehole 104 within a subterranean formation 106. Although the surface 122 is shown as land in FIG. 1, the drilling rig of some embodiments may be located at sea, in which case the surface 122 would comprise a drilling platform. A drilling assembly may be at least partially disposed within the borehole 104. The drilling assembly may comprise a drill string 114, a bottom hole assembly (BHA) 108, a drill bit 110, and a top drive or rotary table 126. The drill string 114 may comprise multiple drill pipe segments that are threadedly engaged. The BHA 108 may be coupled to the drill string 114, and the drill bit 110 may be coupled to the BHA 108. The top drive 126 may be coupled to the drill string 114 and impart torque and rotation to the drill string 114, causing the drill string 114 to rotate. Torque and rotation imparted on the drill string 114 may be transferred to the BHA 108 and the drill bit 110, causing both to rotate. The rotation of the drill bit 110 by the top drive 126 may cause the drill bit 110 to engage with or drill into the formation 106 and extend the borehole 104. Other drilling assembly arrangements are possible, as would be appreciated by one of ordinary skill in the art in view of this disclosure.

The BHA 108 may include tools such as LWD/MWD elements 116 and telemetry system 112 and may be coupled to the drill string 114. The LWD/MWD elements 116 may comprise downhole instruments, including sensors 160 that measure downhole conditions. While drilling is in progress, these instruments may continuously or intermittently monitor downhole conditions, drilling parameters, and other formation data. Information generated by the LWD/MWD element 116 may be stored while the instruments are downhole, and recovered at the surface later when the drill string is retrieved. In certain embodiments, information generated by the LWD/MWD element 116 may be communicated to the surface using telemetry system 112. The telemetry system 112 may provide communication with the surface over various channels, including wired and wireless communications channels as well as mud pulses through a drilling mud within the borehole 104.

The drill string 114 may extend downwardly through a surface tubular 150 into the borehole 104. The surface tubular 150 may be coupled to a wellhead 151 and the top drive 126 may be coupled to the surface tubular 150. The wellhead 151 may include a portion that extends into the borehole 104. In certain embodiments, the wellhead 109 may be secured within the borehole 104 using cement, and may work with the surface tubular 108 and other surface equipment, such as a blowout preventer (BOP) (not shown), to prevent excess pressures from the formation 106 and borehole 104 from being released at the surface 103.

During drilling operations, a pump 152 located at the surface 122 may pump drilling fluid from a fluid reservoir 153 through the upper end of the drill string 114. As indicated by arrows 154, the drilling fluid may flow down the interior of drill string 114, through the drill bit 106 and into a borehole annulus 155. The borehole annulus 155 is created by the rotation of the drill string 114 and attached drill bit 110 in borehole 104 and is defined as the space between the interior/inner wall or diameter of borehole 104 and the exterior/outer surface or diameter of the drill string 114. The annular space may extend out of the borehole 104, through the wellhead 151 and into the surface tubular 150. The surface tubular 150 may be coupled to a fluid conduit 156 that provides fluid communication between the surface tubular 150 and the surface reservoir 153. Drilling fluid may exit from the borehole annulus 155 and flow to the surface reservoir 153 through the fluid conduit 156.

In certain embodiments, at least some of the drilling assembly, including the drill string 114, BHA 108, and drill bit 110 may be suspended from the rig 102 on a hook assembly 157. The total force pulling down on the hook assembly 157 may be referred to as the hook load. The hook load may correspond to the weight of the drilling assembly reduced by any force that reduces the weight. Example forces include friction along the wellbore wall and buoyant forces on the drillstring caused by its immersion in drilling fluid. When the drill bit 110 contacts the bottom of the formation 106, the formation will offset some of the weight of the drilling assembly, and that offset may correspond to the weight-on-bit of the drilling assembly. The hook assembly 157 may include a weight indicator that shows the amount of weight suspended from the hook 157 at a given time. In certain embodiments, the hook assembly 157 may include a winch, or a separate winch may be coupled to the hook assembly 157, and the winch may be used to vary the hook load/weight-on-bit of the drilling assembly.

In certain embodiments, the drilling system 100 may comprise a control unit 124 positioned at the surface 122. The control unit 124 may be communicably coupled to one or more controllable elements of the drilling system 100, including the pump 152, hook assembly 157, LWD/MWD elements 116, and top drive 126. Controllable elements may comprise drilling equipment whose operating states can be altered or modified through an electronic control signals. The control unit 124 may comprise an information handling system that may at least partially implement a control system or algorithm for at least one controllable element of the drilling system 100.

In certain embodiments, the control unit 124 may receive inputs from the drilling system 100 and output one or more control signals to a controllable element. The control signal may cause the controllable element to vary one or more drilling parameters. Example drilling parameters include drilling speed, weight-on-bit, and drilling fluid flow rate. The control signals may be directed to the controllable elements of the drilling system 100 generally, or to actuators or other controllable mechanisms within the controllable elements of the drilling system 100 specifically. For example, the top drive 126 may comprise an actuator through which torque imparted on the drill string 114 is controlled. Likewise, hook assembly 157 may comprise an actuator coupled to the winch assembly that controls the amount of weight borne by the winch. In certain embodiments, some or all of the controllable elements of the drilling system 100 may include limited, integral control elements or processors that may receive a control signal from the control unit 124 and generate a specific command to the corresponding actuators or other controllable mechanisms.

In the embodiment shown, control signals may be directed to one or more of the pump 152, the hook assembly 157, the LWD/MWD elements 116, and the top drive 126. A control signal directed to the pump 152 may vary the flow rate of the drilling fluid that is pumped into the drill string 114. A control signal directed to the hook assembly 157 may vary the weight-on-bit of the drilling assembly by causing a winch to bear more or less of the weight of the drilling assembly. A control signal directed to the top drive may vary the rotational speed of the drill string 114 by changing the torque applied to the drill string 114. A control signal directed to the LWD/MWD elements 116 may cause the LWD/MWD elements 116 to take a measurement of the formation 106, or may vary the type or frequency of the measurements taken by the LWD/MWD elements 116. Other control signal types would be appreciated by one of ordinary skill in the art in view of this disclosure.

Figure 2:
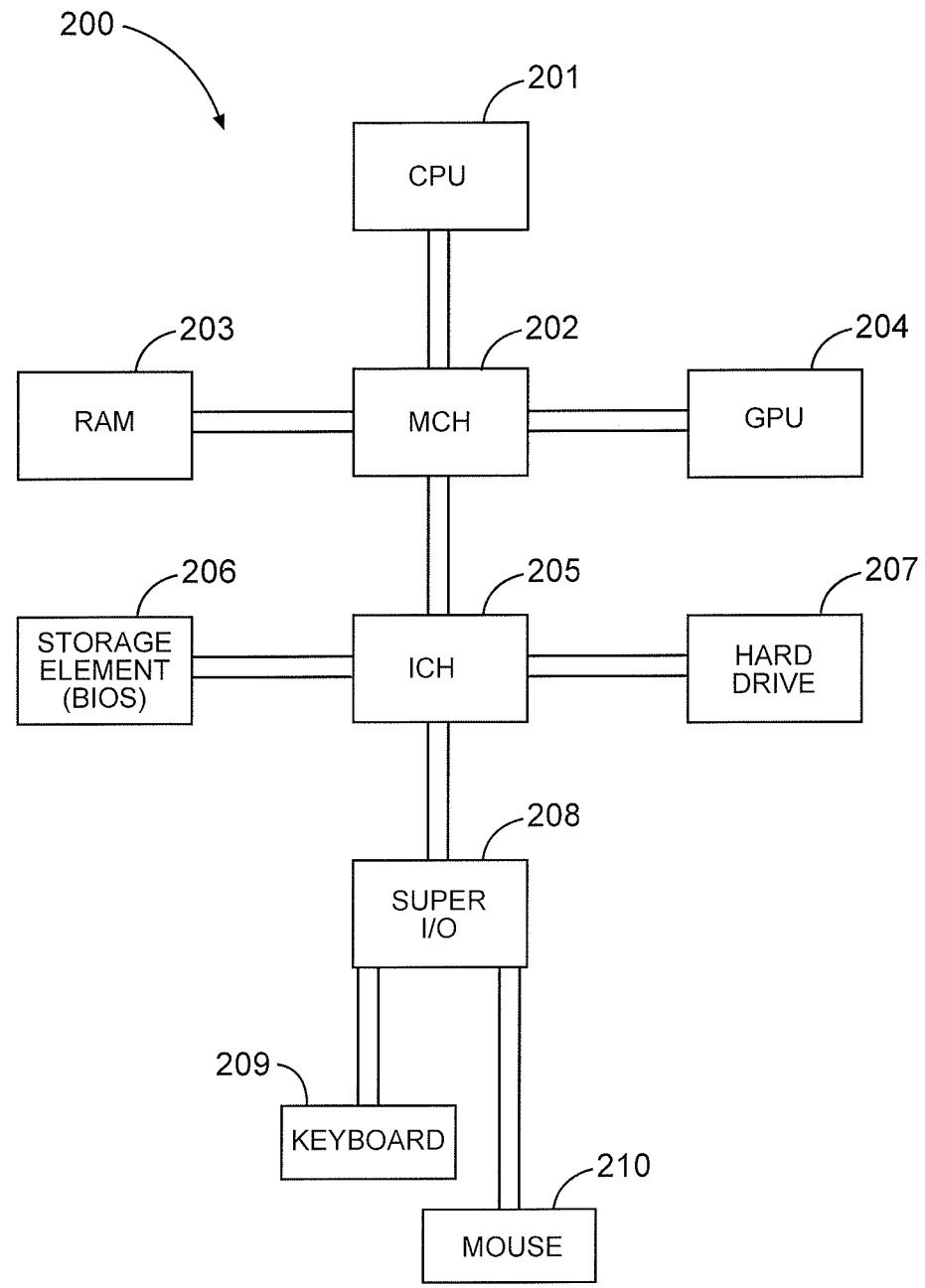
FIG. 2 is a diagram of an example information handling system, according to aspects of the present disclosure.

FIG. 2 is a block diagram showing an example information handling system 200, according to aspects of the present disclosure. Information handling system 200 may be used, for example, as part of a control system or unit for a drilling assembly. For example, a drilling operator may interact with the information handling system 200 to alter drilling parameters or to issue control signals to drilling equipment communicably coupled to the information handling system 200. The information handling system 200 may comprise a processor or CPU 201 that is communicatively coupled to a memory controller hub or north bridge 202. Memory controller hub 202 may include a memory controller for directing information to or from various system memory components within the information handling system, such as RAM 203, storage element 206, and hard drive 207. The memory controller hub 202 may be coupled to RAM 203 and a graphics processing unit 204. Memory controller hub 202 may also be coupled to an I/O controller hub or south bridge 205. I/O hub 205 is coupled to storage elements of the computer system, including a storage element 206, which may comprise a flash ROM that includes a basic input/output system (BIOS) of the computer system. I/O hub 205 is also coupled to the hard drive 207 of the computer system. I/O hub 205 may also be coupled to a Super I/O chip 208, which is itself coupled to several of the I/O ports of the computer system, including keyboard 209 and mouse 210. The information handling system 200 further may be communicably coupled to one or more elements of a drilling system though the chip 208.

Control systems and methods incorporating aspects of the present disclosure may be used to control drilling parameters and to avoid unwanted operating conditions for a drilling system. One example unwanted operating condition for a drilling assembly is stick-slip oscillations or vibrations, which are the result of torque friction, typically nonlinear, on a drill string. These oscillations can cause damage to a drilling assembly as well as reduce the rate of penetration for a drilling operation. Frictional torque can be difficult to measure and adjust for, however. As will be described below, an example control system may determine in real-time or near real-time the frictional torque acting on a drill string using models of a drilling assembly, and generate a control signal to one or more controllable elements of the drilling system to avoid the frictional torque and, therefore, the stick-slip oscillations.

Exemplary control systems may include a control unit/information handling system communicatively coupled to an element of the drilling assembly or to an actuator or other controllable mechanism within a controllable element of the drilling assembly. For example, a control unit may include at least one processing resource, an interface unit capable of transmitting a control signal to an element of a drilling system (e.g., a top drive or an actuator of a top drive), and a computer-readable medium comprising executable instructions suitable for carrying out any one or more control methods according to the present disclosure. In other embodiments, the control system may include means for outputting control signal guidance (e.g., a monitor or other display mechanism, and/or an aural signaling mechanism, or any other device suitable for outputting control signal guidance) such that an operator may implement such control signal guidance via manual input to a control mechanism for controlling the element of the drilling system.

Figure 3:
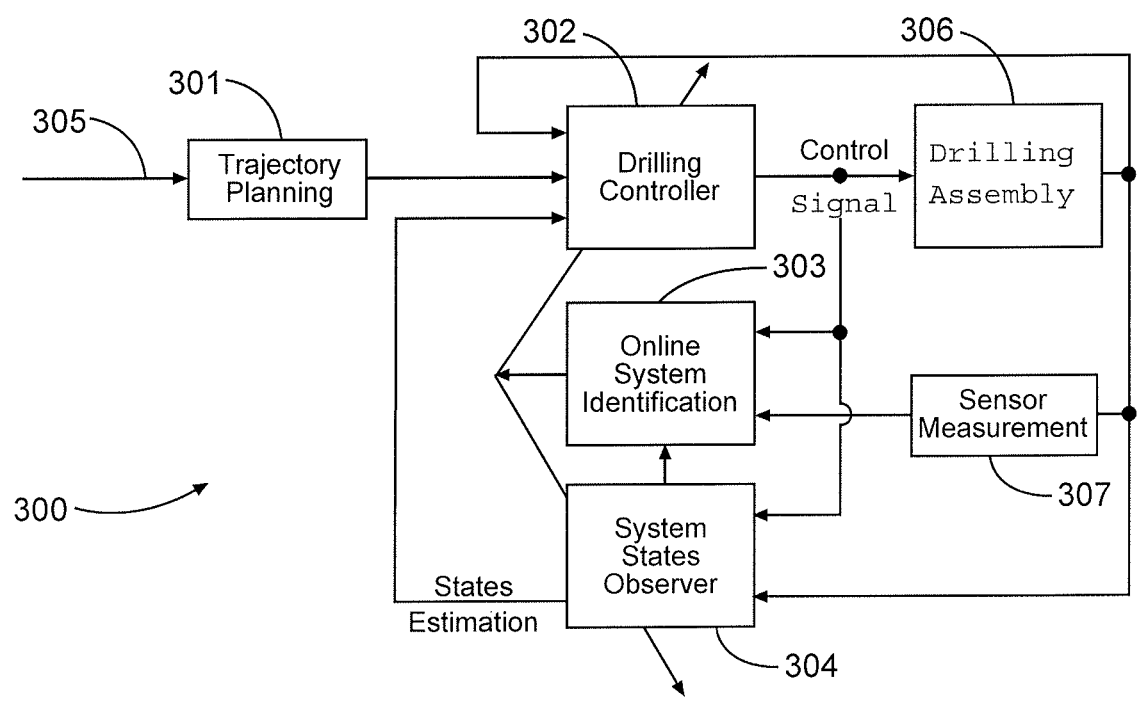
FIG. 3 is a diagram of an example control system, according to aspects of the present disclosure.

FIG. 3 is a diagram of an example control system 300, according to aspects of the present disclosure. The control system 300 may be at least partially implemented within an information handling system and may comprise trajectory planning element 301, a drilling controller 302, an online system identification element 303, and a system states observer 304. The control system 300 may receive a command 305 from an operator that, in certain embodiments, may comprise an operating point command intended to cause a change in a drilling parameter from a first state or operating point to a second state or operating point. The command 305 may be directed to a particular controllable element of a drilling system 306 responsible for the drilling parameter (e.g., the top drive for a change in drilling speed). The trajectory planning element 301 may receive the command 305 and may generate a trajectory profile. The trajectory profile may be received at the drilling controller 302, which may also receive an output from the online system identification element 303 and the system states observer 304. The drilling controller 302 may generate a control signal that is based, at least in part, on the trajectory profile and the outputs from the online system identification element 303 and the system states observer 304. The drilling controller may transmit the control signal to the controllable element, causing the desired change in the drilling parameter from the first state or operating point to the second state or operating point.

In certain embodiments, the drilling system 306 may comprise one or more downhole sensors that generate measurements corresponding to one or more drilling parameters or other downhole conditions. The sensor outputs 307 may be received at the online system identification element 303, the system states observer 304, and the drilling controller 302. Additionally, the control signal generated by the drilling controller 302 may be received at the online system identification element 303 and the system states observer 304. The outputs of both the online system identification element 303 and the system states observer 304 may be based, at least in part, on the sensor outputs 307 and the generated control signal. This may provide a feedback, closed-loop system within the control system 300.

In certain embodiments, the drilling controller 302, system states observer 304, and online system identification element 303 may utilize models of a drilling assembly to generate their outputs. Example models include lumped mass models, as will be described below. The online system identification element 303 may determine values for dynamic system properties that are otherwise difficult to measure or determine, such as frictional torque and drill string torsional stiffness and damping, that are incorporated into the control unit models. The system states observer 304 may determine values or "state estimations" for other variables within the control unit models that may also be incorporated into the control unit models. The drilling controller 302 may utilize the dynamic system property values and the states estimations to generate a control signal using a backstepping method to avoid stick-slip oscillations and other undesired operating conditions. The control signal generated by the drilling controller 302 may also function to maintain a desired rotating speed for a drill bit of the drilling assembly 306.

Figure 4:
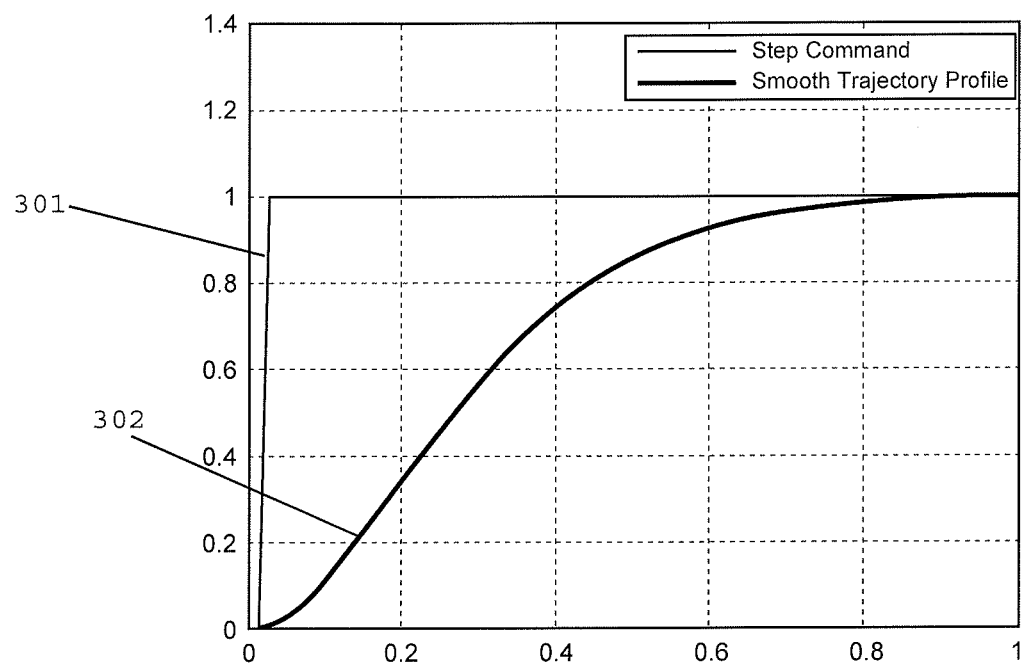
FIG. 4 is a chart of an example trajectory profile, according to aspects of the present disclosure.

FIG. 4 is a chart of an example trajectory profile, according to aspects of the present disclosure. As described above, a trajectory planning element may receive a command from a drilling operator and may generate a trajectory profile. In the embodiments shown, the command comprises a step command 301, where the command switches from a first operating point to a second operating point nearly instantaneously. Practically speaking, such a step command requires a large surge of current or voltage that may saturate an actuator within a controllable element of a drilling system. An example trajectory planning element may generate a corresponding trajectory profile 302 that drives the controllable element of the drilling system from the first operating point to the second operating point as quickly as possible without saturating a corresponding actuator. As can be seen, the trajectory profile 302 may comprise a smooth profile that can be expressed as a polynomial function, a sinusoidal function, or any other smooth function that would be appreciated by one of ordinary skill in the art in view of this disclosure.

In certain embodiments, the trajectory planning element may have access to operational parameters for the controllable elements of the drilling system to which the command will be directed, and the trajectory profile may be generated based, at least in part, on the operational parameters. For example, the step command 301 may correspond to a drilling parameter controlled by a particular controllable element, such as drilling speed controlled by a top drive, and the trajectory planning element may access the operation parameters corresponding to the controllable element. In certain embodiments, however, the trajectory planning element also may access operational parameters for other controllable elements of the drilling system, such as pumps, hook assemblies, etc., when generating the trajectory profile. The trajectory planning element may further generate a second trajectory profile for a different controllable element of the drilling system, based on the first trajectory profile.

Figure 5:
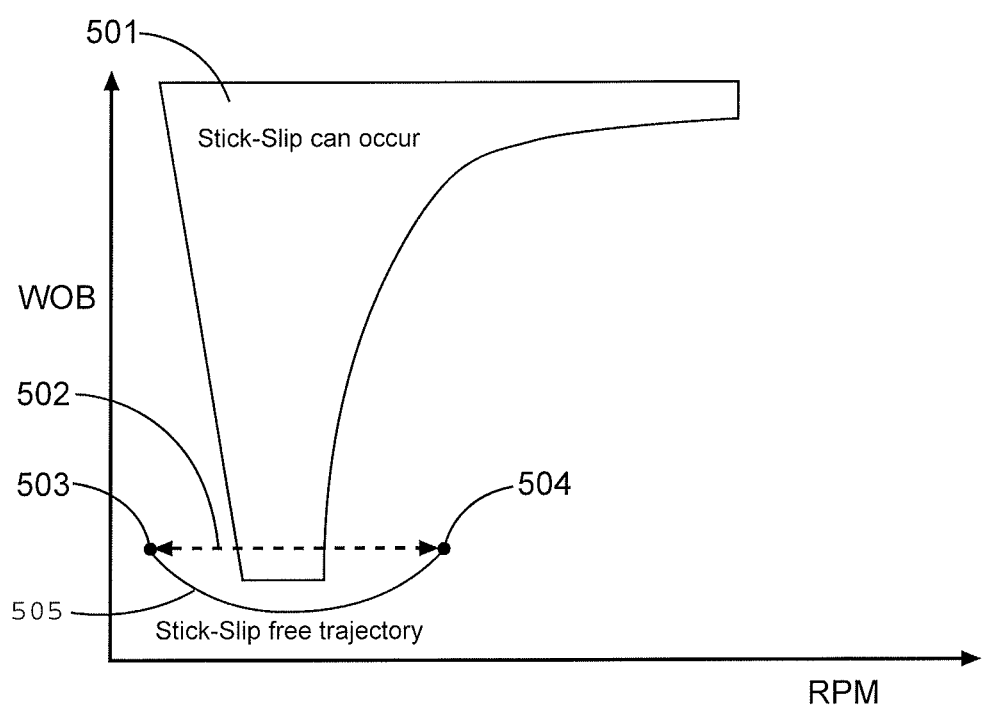
FIG. 5 is a chart of an example trajectory planning operation, according to aspects of the present disclosure.

FIG. 5 is a chart of an example trajectory planning operation, according to aspects of the present disclosure. As can be seen, the chart 500 includes a first drilling parameter (weight-on-bit, "WOB") on the y-axis and a second drilling parameter (drilling speed in rotations per minute "RPM") on the x-axis. The chart 500 further includes an outlined region 501 that corresponds to combinations of the first and second drilling parameters that may cause an undesired operating condition. Example undesired operating conditions include physical break down of elements of the drilling assembly or stick-slip oscillation. The combinations may be determined, for example, using an earth models, offset data, a dynamic model of a drilling assembly, sensor data, or some combination of the above.

In the embodiment shown, the outlined region 501 identifies the combinations of drilling speeds and weights-on-bit that are likely to cause stick-slip oscillations. The dashed line indicates a first trajectory profile 502 to change the drilling speed from a first drilling speed 503 to a second drilling speed 504. The first trajectory profile 502 may correspond to an operating command entered by a drilling operator, for example. As can be seen, due to the current weight-on-bit, the first trajectory profile 502 will force the drilling assembly into the stick-slip region 501. According to aspects of the present disclosure, a second trajectory profile may be generated based, at least in part, on the first trajectory to ensure that the drilling assembly avoids the stick-slip region 501. The second trajectory profile may be generated automatically when the first trajectory profile 502 is generated, and output to the appropriate controllable element of the drilling system when the first trajectory profile is output, the hook assembly in this embodiment. The first trajectory profile 502 and the second trajectory profile are shown charted together as trajectory 505, in which both the drilling speed and weight-on-bit change simultaneously to avoid the stick slip region 501. Notably, the operating points 503 and 504 for the weight-on-bit may be the same before and after the trajectory profile is generated.

Figure 6:
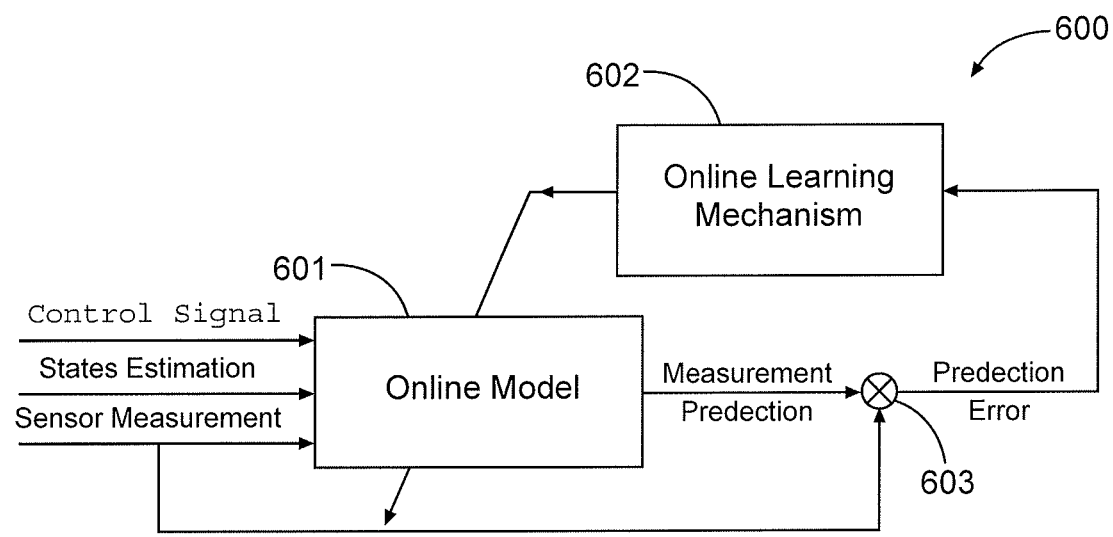
FIG. 6 is a diagram of an example online system identification element, according to aspects of the present disclosure.

FIG. 6 is a block diagram of an example online system identification element 600, according to aspects of the present disclosure. As described above, the online system identification element 600 may determine dynamic system properties that are otherwise difficult to measure or determine. These dynamic system properties may comprise parametric uncertainties that are either unknown constants or values that vary slowly with respect to time. Example parametric uncertainties include system inertia, torsional stiffness, damping coefficients, and frictional torques/coefficients.

The online system identification element 600 may comprise an online model 601 and an online learning mechanism 602. In the embodiment shown, the online model 601 may receive as inputs a control signal generated by a drilling controller, a states estimation generated by a system states observer, and a sensor measurement from a sensor of a drilling assembly. The online model 601 may generate a predicted sensor measurement based on the inputs and an identified parametric value. The predicted sensor measurement may correspond to the type of sensor measurement received as an input to the online system identification element 600. The identified parametric value within the online model 601 may be updated through an online learning process, which seeks to align the predicted sensor measurement of the online model 601 with the input sensor measurement. The identified parametric value may be retrieved from the online system identification element 600 and used by a drilling controller to generate a control signal.

In certain embodiments, the online learning process may include comparing the predicted sensor measurement of the online model 601 with the input sensor measurement at a comparator 603. The output of the comparator 603 may comprise a prediction error within the online model 601. The prediction error may be caused by an error in the identified parametric value used within the online model 601. In certain embodiments, the prediction error may be input into the online learning mechanism 602, which may update the indentified parametric value using an online learning algorithm and a system identification algorithm, such as a gradient search or least recursive square.

In an exemplary embodiment, the identified parametric value may comprise frictional torque. In those embodiments, the frictional torque value used in the online model 601 may be updated using the following online learning algorithm in the online learning mechanism 602:

$$TOB(\Omega_1) = T_C \, \text{sgn}(\Omega_1) + T_r \sqrt{|\Omega_1|} \, \text{sgn}(\Omega_1) \quad \text{Equation (1):}$$

where $\Omega_1$ comprises the rotating speed of a drill bit; TOB comprises the frictional torque acting on the drill bit; $T_c$ comprises Coulomb friction; and $T_r$ comprises the effect of static friction. As the inputs to the online system identification element 600 change, the online system identification element 600 may continue to generate predicted sensor measurements which can then be compared to the actual sensor measurements to update the TOB parameter. The TOB parameter, in turn, may be used by a drilling controller to generate a control signal that avoids stick-slip oscillations.

The online model 601 and other models used within an exemplary control system may utilize values corresponding to downhole conditions of an actual drilling assembly. Typically, it is hard to install sensors to measure certain downhole conditions due to harsh downhole environment. Even if some sensors can be installed, they usually have very slow update rates because of low bandwidth communication link between downhole instruments and surface.

Figure 7:
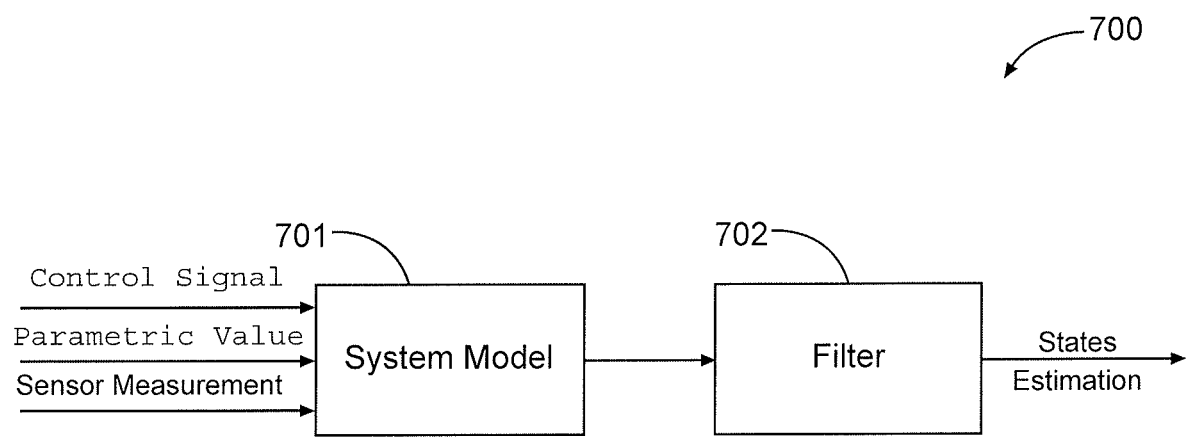
FIG. 7 is a diagram of an example system states observer, according to aspects of the present disclosure.

According to aspects of the present disclosure, a system states observer may be used to generate downhole condition values that can be incorporated into the online model 601 and other system models. FIG. 7 is a block diagram of an example system states observer 700, according to aspects of the present disclosure. The system states observer 700 may utilize a separate system model to provide estimations of certain downhole conditions required by other models in the control system. In the embodiment shown, the system states observer comprises a system model 701, and the downhole condition values may correspond to "system states" or variable within the system model 701. The system model 701 may receive as inputs a control signal from a drilling controller and sensor measurements. In certain embodiments, the system model 701 may also receive as an input one or more parametric values, such as frictional torque, from an online system identification element, the received parametric values being used to update parameters within the system model 701 to accommodate system operating condition changes. System states estimations may be output from the system model 701 and filtered at filter 702. The filtered results may be transmitted, for example, to a drilling controller and an online system identification element to be incorporated as downhole condition values into their corresponding system models.

The system model 701 may have certain discrepancies or uncertainties compared to the actual drilling assembly. Furthermore, sensor measurements used as inputs to the system model 701 may have certain noise characteristics. The filter 702 may minimize the effects of both uncertainties in the system model 701 and noise within the sensor measurements. Example filters include Kalman filters or other linear quadratic estimations (LQEs), particle filters or other sequential Monte Carlo methods (SMCs), and other statistical estimation techniques can be adopted to provide a statistical optimal estimation of system states.

In certain embodiments, the filter 702 may be adaptive, both in the type of filter that is used and how a particular filter functions. Filter 702 may include a Kalman filter and a particle filter that may be adaptively adopted based on properties of the drilling assembly model and noise characteristics. For example, a drilling system may show both linear and nonlinear behaviors depending on the operating condition. When a drilling speed is large, the behavior may be approximately linear, whereas when the drilling speed is small, the behavior may be highly nonlinear. When the system model 701 shows linear behavior, the system states observer 700 may adopt a Kalman filter to sequentially generate system states estimates from the available sensor measurements using a Kalman gain matrix.

The Kalman filter further may be updated and modified each time a new measurement is available. For example, when a new sensor measurement is available, posterior and prior estimation error covariance matrices may be updated based on the system model and the assumed Gaussian system/measurement noise. This may minimize the trace of error covariance matrices and produce an updated Kalman gain matrix. The updated Kalman gain matrix, the current sensor measurement and the latest estimated state may then be used to estimate current system states.

When the system model 701 shows nonlinear behavior, the system states observer 700 may adopt a particle filter. Particle filters are preferred over Kalman filters when highly nonlinear behaviors exist because nonlinearity subjects Kalman filters and similar filters to considerable estimation error. An example particle filter may utilize a Monte Carlo sampling-based numerical solution, where it is assumed that a group of equally weighted samples have been generated for a current time. When a new measurement is available, the sample weights may be updated according to the probability of getting this new measurement by feeding the current state samples into the system model 701. The weighted samples may be used to approximate the posterior distribution, where the mean is the estimated system state. The weighted samples then may be resampled via a predesigned importance function to generate a new set of equally weighted samples to be used at the next time step.

In certain embodiments, the system states observer 700 may switch between a Kalman filter and a particle filter in real time dependant on the performance. If the Kalman filter parameters are changing quickly due to stick-slip behavior, for example, then the system states observer 700 will switch to a particle filter. When the non-linearities of the stick-slip behavior are reduced to a level that the Kalman filter can predict the behavior, the system states observer 700 may switch back to the Kalman filter.

Figure 8:
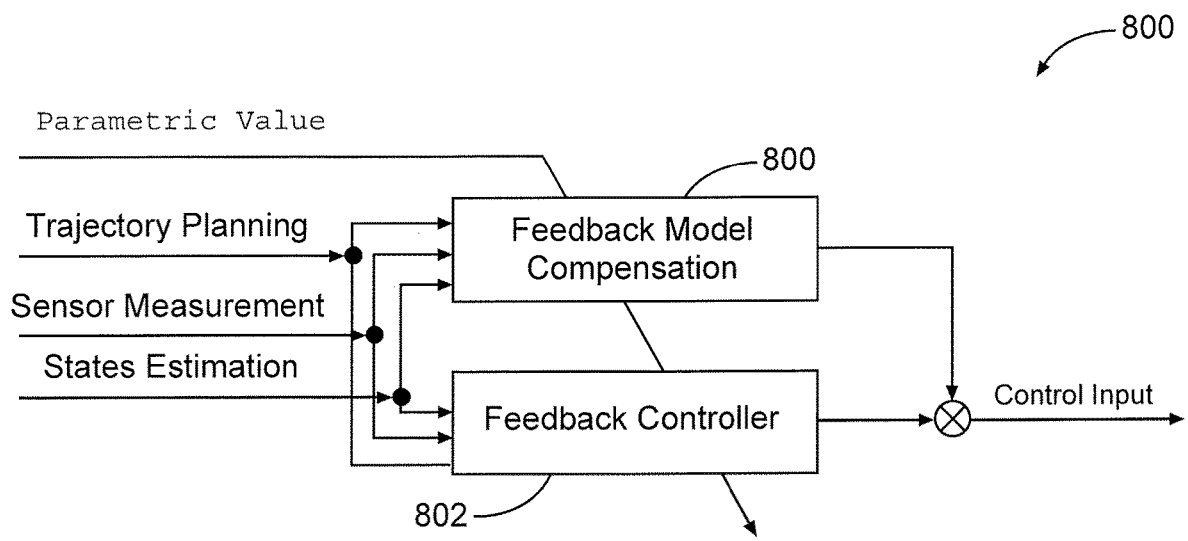
FIG. 8 is a diagram of an example drilling controller, according to aspects of the present disclosure.

FIG. 8 is a block diagram of an example drilling controller 800, according to aspects of the present disclosure. The drilling controller 800 may comprise a feedforward model compensation element 801 and a feedback controller element 802. Both the feedforward model compensation element 801 and the feedback controller element 802 may receive inputs from an online system identification element, a trajectory planning element, a system states observer, and downhole sensors. In an exemplary embodiment, these inputs may include frictional torque values from the online system identification elements, state estimations from the system states observer, and sensor measurements from downhole sensors. The feedforward model compensation element 801 may synthesize some or all of the above inputs into a control signal that compensates for the frictional torque. In certain embodiments, the feedforward model compensation element 801 may utilize a backstepping design methodology based on at least one system model of a drilling assembly. The outputs of the feedforward model compensation element 801 and the feedback controller element 802 may both be fed into a comparator 803, the output of which is a control signal that may be transmitted to a controllable element of a drilling assembly or to an actuator within the element of the drilling assembly.

Figure 9:
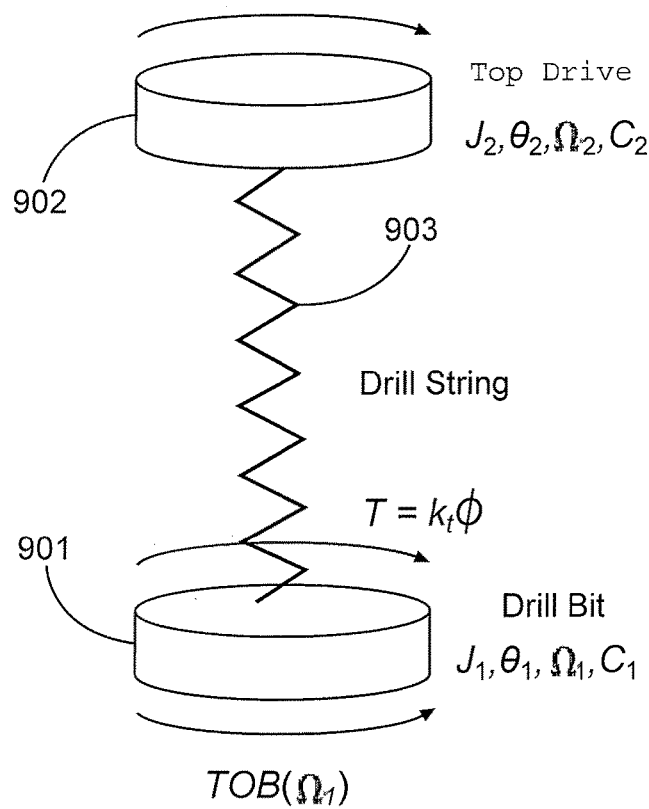
FIG. 9 is a diagram of an example lumped mass model, according to aspects of the present disclosure.

The system model used in the backstepping design model of the drilling controller 800, and within at least one of the online system identification element and the system states observer, may comprise a lumped mass model of the drilling assembly. FIG. 9 is a diagram of an example lumped mass model 900, according to aspects of the present disclosure. The lumped mass model 900 may be used to model rotational dynamics of an example drilling assembly. A drill bit 901 and a top drive 902 are represented as lumped masses with inertias $J_1$ and $J_2$, rotating speeds $\Omega_1$ and $\Omega_2$, and viscous damping coefficients $C_1$ and $C_2$, respectively. A drill string 903 disposed between the drill bit 901 and top drive 902 may be modeled as a torsional spring with stiffness $k_t$. According to aspects of the present disclosure, the rotational dynamics of the system may be represented using the following differential equations:

$$J_1\dot{\Omega}_1 + C_1\Omega_1 + TOB(\Omega_1) = k_t\varphi \quad \text{(Equation 2):}$$

$$\dot{\varphi} = \Omega_2 - \Omega_1 \quad \text{(Equation 3):}$$

$$J_2\dot{\Omega}_2 + C_2\Omega_2 + k_t\varphi = T_m \quad \text{(Equation 4):}$$

where $TOB(\Omega_1)$ comprises the frictional torque acting on drill bit 901, $\varphi$ comprises the drill string twist; $\dot{\varphi}$ comprises the rate of change of the drill string twist; $\dot{\Omega}_1$ comprises the rate of change of the rotating speed $\Omega_1$; $\dot{\Omega}_2$ comprises the rate of change of the rotating speed $\Omega_2$; and $T_m$ comprises the control signal received at the top drive 902.

Figure 10:
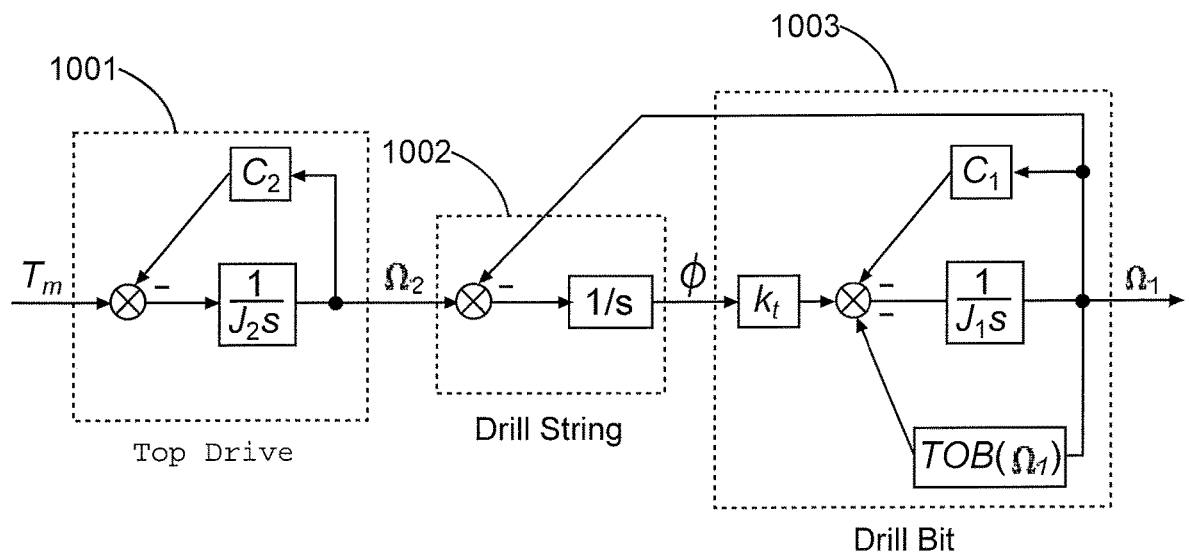
FIG. 10 is a diagram of example dynamic blocks corresponding to a system model of a drilling assembly, according to aspects of the present disclosure.

The above differential equations and lumped mass model may be arranged into three first order dynamic blocks for use in a backstepping design method. FIG. 10 is a diagram of example dynamic blocks, according to aspects of the present disclosure. The blocks may comprise the top drive 1001, the drill string 1002, and the drill bit 1003. Each of the blocks may have at least one input and one output. Namely, the top drive 1001 may receive as an input the control signal $T_m$ and may generate as an output a top drive rotating speed or motion profile $\Omega_2$. The drill string block 1002 may receive the top drive rotating speed or motion profile $\Omega_2$ from the top drive block 1001 and a drill bit rotating speed or motion profile $\Omega_1$ from the drill bit block 1003 and output a drill string twist $\varphi$. The drill bit block 1003 may receive as an input the drill string twist $\varphi$ and output a drill bit rotating speed or motion profile $\Omega_1$, which may be used to determined the frictional torque on the drill bit $TOB(\Omega_1)$.

Although an accurate estimation of frictional torque acting on drilling bit can be achieved by online system ID, avoiding the frictional torque at the drill bit $TOB(\Omega_1)$ can be difficult. As can be seen in FIG. 10, torque at the top drive caused by control signal $T_m$ must propagate through the top drive 1001 and the drill string 1002 to affect the drill bit 1003. In certain embodiments, an exemplary control system may design the control signal $T_m$ using a backstepping design method, where dynamic interconnections system are processed in a backward fashion from drill bit motion profile $\Omega_1$ to control signal $T_m$ with multiple steps.

Figure 11:
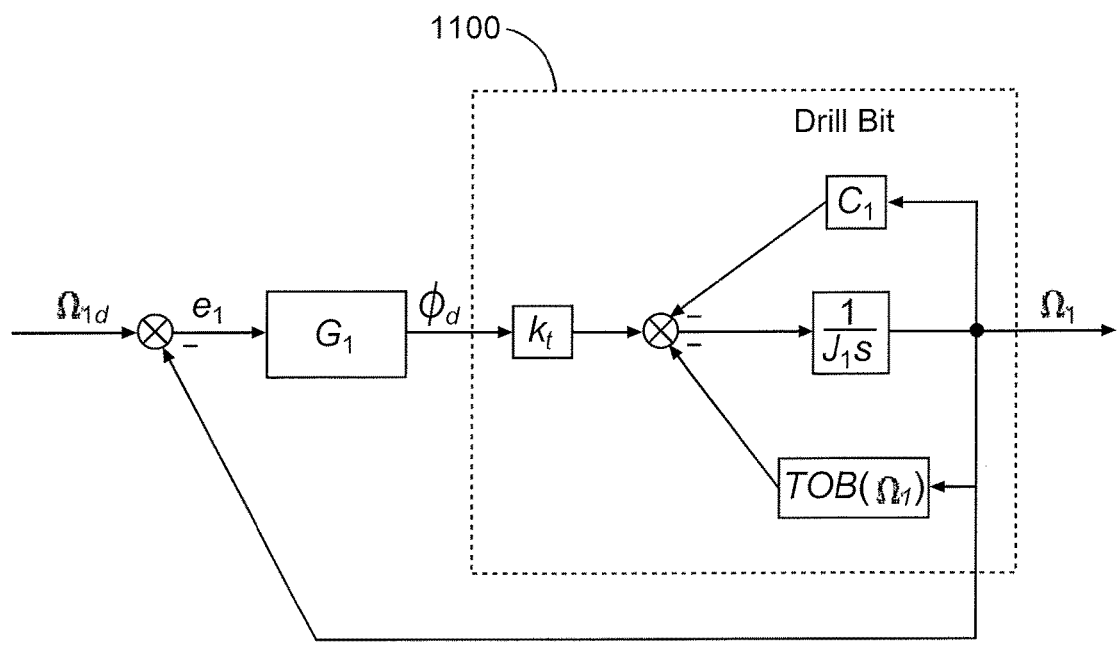
FIG. 11 is a diagram of an example first backstepping design step, according to aspects of the present disclosure.

FIG. 11 is a diagram of a first backstepping design step, according to aspects of the present disclosure. Since the drill bit motion profile $\Omega_1$ is driven by the drill string twist torque $k_t\varphi$ which is proportional to the drill string twist $\varphi$, the first backstepping design step may comprise designing a desired drill string twist $\varphi_d$ that produces the desired drill bit motion profile $\Omega_{1d}$ to overcome frictional torque. In the embodiment shown, the first backstepping design step comprises a drill bit dynamics block 1100 derived from a lumped mass model of a drilling assembly, similar to the drill bit block in FIG. 10. The drill bit dynamics block 1100 may produce a drill bit motion profile $\Omega_1$ in response to a drill string twist $\varphi_d$ input. The generated drill bit motion profile $\Omega_1$ may be compared to the desired drill bit motion profile $\Omega_{1d}$, and the resulting speed tracking error $e_1$ may be used to modify the drill string twist $\varphi_d$ within block $G_1$ until the drill bit motion profile $\Omega_1$ is within a pre-determined range of the desired drill bit motion profile $\Omega_{1d}$, indicating that the desired drill string twist $\varphi_d$ value has been reached. In certain embodiments, the desired drill string twist $\varphi_d$ may be calculated within block $G_1$ using the following equation:

$$\varphi = (1/k_1)(\hat{T}OB(\Omega_1) + C_1\Omega_1 J_1\dot{\Omega}_{1d} - k_1 e_1) \quad \text{Equation (5):}$$

where $e_1 = \Omega_1 - \Omega_{1d}$; $k_1$ comprises a positive feedback gain; $\dot{\Omega}_{1d}$ comprises a desired drill bit acceleration profile; and $\hat{T}OB(\Omega_1)$ comprises an estimated frictional torque expressed as $$\hat{T}OB(\Omega_1) = \hat{T}_c\,\text{sgn}(\Omega_1) + \hat{T}_r\sqrt{|\Omega_1|}\,\text{sgn}(\Omega_1) \quad \text{Equation (6):}$$

where $\hat{T}_c$ comprises an estimated value of $T_c$; and $\hat{T}_r$ comprises an estimated value of $T_r$.

Figure 12:
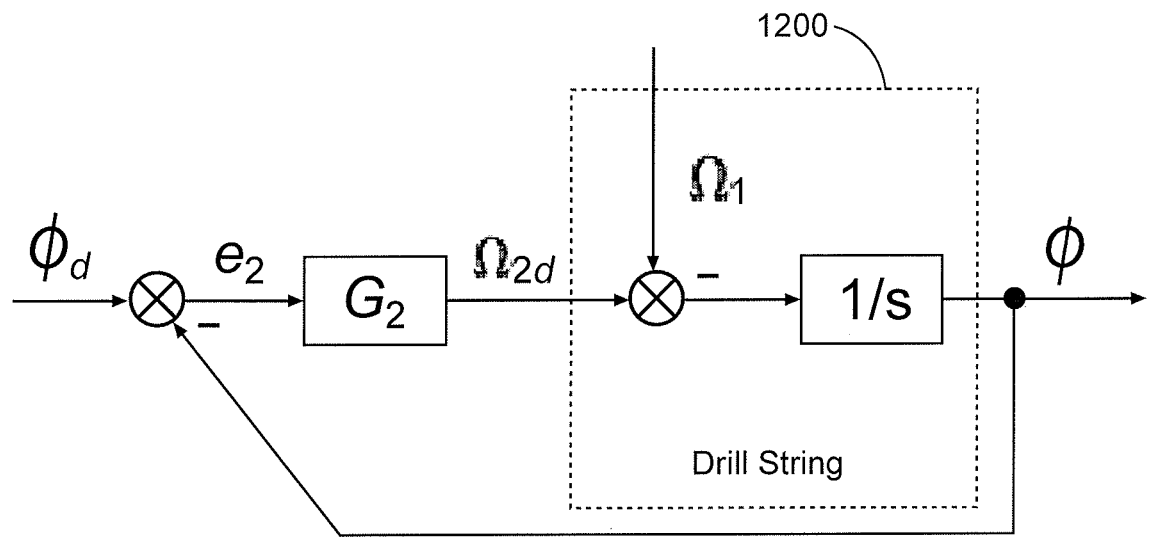
FIG. 12 is a diagram of an example second backstepping design step, according to aspects of the present disclosure.

Once the desired drill string twist $\varphi_d$ is calculated so that it produces the desired drill bit motion profile $\Omega_{1d}$, a corresponding desired top drive motion profile $\Omega_{2d}$ that causes the desired drill string twist $\varphi_d$ may be calculated. FIG. 12 is a block diagram of a second backstepping design step, according to aspects of the present disclosure. In the embodiment shown, the second backstepping design step comprises a drill string dynamics block 1200 derived from a lumped mass model of a drilling assembly, similar to the drill bit block in FIG. 10. As seen in Equations (2)-(4), the drill string twist $\varphi$ of a drill string may be a function of the rotary table motion profile $\Omega_2$ and the drill bit motion profile $\Omega_1$. The drill string dynamics block 1200 may generate a drill string twist φ in response to a drill bit motion profile $\Omega_1$ and a desired top drive motion profile $\Omega_{2d}$. The generated drill string twist φ may be compared to the desired drill string twist $\varphi_d$ determined in the first backstepping design step to determine a twist error $e_2$. The twist error $e_2$ may be input to controller box $G_2$ which may update the value of the desired top drive motion profile $\Omega_{2d}$ to reduce the twist error $e_2$.

Figure 13:
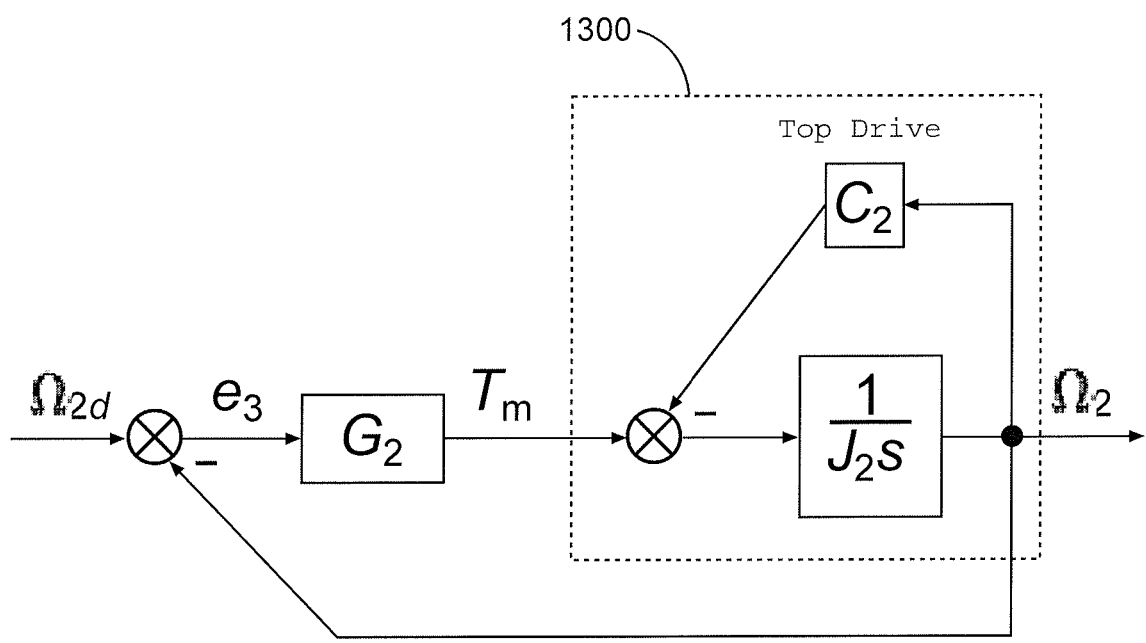
FIG. 13 is a diagram of an example third backstepping design step, according to aspects of the present disclosure.

Once the desired top drive motion profile $\Omega_{2d}$ has been calculated such that it causes the desired drill string twist $\varphi_d$, which in turn causes the desired drill bit motion profile $\Omega_{1d}$, a control signal input $T_m$ to the top drive that causes desired top drive motion profile $\Omega_{2d}$ may be calculated. FIG. 13 is a block diagram of a third backstepping design step, according to aspects of the present disclosure. In the embodiment shown, the third backstepping design step comprises a top drive dynamics block 1300 derived from a lumped mass model of a drilling assembly, similar to the drill bit block in FIG. 10. As described above, the motion profile $\Omega_2$ of a top drive may be a function of the control signal $T_m$ received at the top drive, the control signal that may be transmitted to the top drive by a control unit coupled to the top drive. The top drive dynamics block 1300 may generate a top drive motion profile $\Omega_2$ in response to a control signal $T_m$. The generated top drive motion profile $\Omega_2$ may be compared to the desired top drive motion profile $\Omega_{2d}$ calculated in the previous design step to determine a speed error $e_3$. The speed error $e_3$ may be input to box $G_3$ which may update the value of the control signal $T_m$ to reduce the speed error $e_3$.

Once the control signal $T_m$ has been calculated, it may be output to a controllable element of a drilling assembly. Because the current embodiment is directed to controlling stick-slip oscillations within a drilling assembly by altering a motion profile of a top drive, the control signal $T_m$ may be output to the top drive, causing the top drive to alter the speed of the drilling assembly. In alternative embodiments, stick-slip oscillations may be controlled using a weight-on-bit parameter, and the control signal may be output to a hook assembly to alter the weight on bit. Other embodiments within the scope of this disclosure would be appreciated by one of ordinary skill in view of this disclosure.

According to aspects of the present disclosure, an example method for removal of stick-slip vibrations may comprise receiving a command directed to a controllable element of a drilling assembly. A smooth trajectory profile may be generated based, at least in part, on the command. A frictional torque value for a drill bit of the drilling assembly may be determined. The example method may further include generating a control signal based, at least in part, on the trajectory profile, the frictional torque value, and a model of the drilling assembly, and transmitting the control signal to the controllable element.

In certain embodiments, the frictional torque value may be determined based, at least in part, on the control signal, a measurement from a sensor within the drilling assembly, and an estimated downhole condition value. The method may further include determining the estimated downhole condition value for the model of the drilling assembly based, at least in part, on the measurement from the sensor within the drilling assembly, the control signal, and the frictional torque. In certain embodiments, determining the downhole condition value for the model comprises adaptively choosing one of a Kalman filter and a particle filter.

In certain embodiments, the drilling assembly may comprise a drill string, a top drive coupled to a proximal end of the drill string; and the drill bit coupled to a distal end of the drill string. The top drive may comprise the controllable element. Generating the control signal to the top drive may comprise receiving at a controller the trajectory profile, the frictional torque, an estimated downhole condition value, and a measurement from a sensor within the drilling assembly. The model of the drilling assembly may comprise a lumped mass model of the drilling assembly with masses corresponding to the top drive and the drill bit, and a torsional spring corresponding to the drill string. In certain embodiments, generating the control signal comprises determining a first motion profile for the drill bit that avoids frictional torque, determining a drill string twist value for the drill string that produces the first motion profile, determining a second motion profile for the top drive that produces the drill string twist value, and determining the control signal to the top drive that produces the second motion profile.

According to aspects of the present disclosure, an example apparatus for removal of stick-slip vibrations may comprise a processor and a memory device coupled to the processor. The memory device may contain a set of instructions that, when executed by the processor, cause the processor to receive a command directed to a controllable element of a drilling assembly; generate a smooth trajectory profile based, at least in part, on the command; determine a frictional torque value for a drill bit of the drilling assembly; generate a control signal based, at least in part, on the trajectory profile, the frictional torque value, and a model of the drilling assembly; and transmit the control signal to the controllable element.

In certain embodiments, the set of instructions that cause the processor to determine the frictional torque value further cause the processor to determine the frictional torque based, at least in part, on the control signal, a measurement from a sensor within the drilling assembly, and an estimated downhole condition value for the model. The set of instructions may further cause the processor to determine the estimated downhole condition value for the model based, at least in part, on the measurement from the sensor within the drilling assembly, the control signal, and the frictional torque value. In certain embodiments, the set of instructions that cause the processor to determine the estimated downhole condition value for the model further cause the processor to adaptively choose one of a Kalman filter and a particle filter.

In certain embodiments, the drilling assembly may comprise a drill string, a top drive coupled to the drill string, and the drill bit coupled to the drill string. The controllable element may comprise the top drive. The set of instructions that cause the processor to generate the control signal further cause the processor to receive the trajectory profile, the frictional torque value, an estimated downhole condition value for the model, and a measurement from a sensor within the drilling assembly. The model may comprise a lumped mass model of the drilling assembly with masses corresponding to the top drive and the drill bit, and a torsional spring corresponding to the drill string. In certain embodiments, the set of instructions that cause the processor to generate the control signal may further cause the processor to determine a first motion profile for the drill bit that avoids frictional torque; determine a drill string twist value for the drill string that produces the first motion profile; determine a second motion profile for the top drive that produces the drill string twist value; and determine the control signal to the top drive that produces the second motion profile.

According to aspects of the present disclosure, an example system for removal of stick-slip vibrations may comprise a drilling assembly that includes a drill string, a top drive coupled to the drill string, and a drill bit coupled to the drill string. The system may further include an information handling system communicably coupled to the top drive that includes a processor and a memory device coupled to the processor. The processor may contain a set of instructions that, when executed by the processor, cause the processor to receive a command directed to the top drive; generate a smooth trajectory profile based, at least in part, on the command; determine a frictional torque value for the drill bit; determine an estimated downhole condition value; generate a control signal to the top drive based, at least in part, on the trajectory profile, the frictional torque value, the estimated downhole condition value, and a model of the drilling assembly; and transmit the control signal to the top drive. The set of instruction that cause the processor to generate the control signal may further cause the processor to determine a first motion profile for the drill bit that avoids the frictional torque; determine a drill string twist value for the drill string that produces the first motion profile; determine a second motion profile for the top drive that produces the drill string twist value; and determine the control signal that produces the second motion profile.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for removal of stick-slip vibrations of a drilling assembly, comprising:

receiving a command, at a control system of the drilling assembly, directed to a first controllable element of the drilling assembly, wherein the first controllable element comprises a drilling equipment of the drilling assembly and wherein the control system comprises a trajectory planning element, a drilling controller, an online system identification element and a system states observer, and wherein the system identification element comprises an online model and an online learning mechanism, and wherein the system states observer comprises a system model, and wherein the drilling controller comprises a feedforward model compensation element and a feedback controller element;

generating, by the trajectory planning element, a smooth trajectory profile based, at least in part, on the command, wherein the smooth trajectory profile is expressed as a smooth function, and wherein the smooth trajectory profile drives the first controllable element from a first operating point to a second operating point without saturating the first controllable element, wherein the trajectory planning element accesses one or more operation parameters corresponding to the first controllable element to which the command is directed;

receiving at the drilling controller the smooth trajectory profile, a first online system identification element output from the online system identification element and a first system states observer output from the system states observer, wherein the first online system identification output comprises an identified parametric value within the online model and wherein the first system states observer output comprises a system states estimation output from the system model, wherein the first system identification element output comprises a nonlinear friction torque on a drilling bit calculated by the first system identification element;

receiving at the online system identification element, the system states observer and the drilling controller one or more first measurements from one or more downhole sensors, wherein the one or more first measurements correspond to at least one of one or more drilling parameters and one or more downhole conditions;

generating, by the drilling controller, a first control signal based, at least in part, on the smooth trajectory profile, the first system identification element output and the first system states observer output;

transmitting, from the drilling controller, the first control signal to the first controllable element to change a drilling parameter of the drilling assembly, the online system identification element and the system states observer;

receiving at the online system identification element and the system states observer the first control signal, wherein a second online system identification element output and a second system states observer output are based, at least in part, on one or more second measurements from the one or more downhole sensors, the first control signal and one or more models of the drilling assembly; and generating, by the drilling controller, a second control signal based, at least in part, on the second identification element output, the second system states observer output and a subsequently generated trajectory profile for a second controllable element.

2. The method of claim 1, wherein the identified parametric value comprises a frictional torque value that is based, at least in part, on at least one of the one or more first measurements and an estimated downhole condition value for the online model of the one or more models.

3. The method claim 2, further comprising determining the estimated downhole condition value for the online model based, at least in part, on the at least one of the one or more first measurements;
the first control signal; and
the frictional torque value.

4. The method of claim 3, wherein determining the estimated downhole condition value for the online model comprises adaptively choosing one of a Kalman filter and a particle filter.

5. The method of claim 1, wherein
the drilling assembly comprises
a drill string;
a top drive coupled to a proximal end of the drill string; and
the drill bit coupled to a distal end of the drill string; and
the first controllable element comprises the top drive.

6. The method of claim 5, wherein generating the first control signal comprises receiving at a drilling controller
the smooth trajectory profile;
the frictional torque value;

an estimated downhole condition value for the online model; and the one or more measurements.

7. The method of claim 6, wherein the online model comprises a lumped mass model of the drilling assembly with masses corresponding to the top drive and the drill bit, and a torsional spring corresponding to the drill string.

8. The method of claim 7, wherein generating the first control signal comprises determining a first motion profile for the drill bit to overcome frictional torque.

9. The method of claim 8, wherein generating the first control signal further comprises;
determining a drill string twist value for the drill string that produces the first motion profile;
determining a second motion profile for the top drive that produces the drill string twist value; and
determining the control signal to the top drive that produces the second motion profile.

10. An apparatus for removal of stick-slip vibrations of a drilling assembly, comprising:
a processor;
a non-transitory memory device coupled to the processor, wherein the memory device contains a set of instructions that, when executed by the processor, cause the processor to:
receive a command, at a control system of the drilling assembly, directed to a first controllable element of the drilling assembly, wherein the first controllable element comprises a drilling equipment of the drilling assembly and wherein the control system comprises a trajectory planning element, a drilling controller, an online system identification element and a system states observer, and wherein the system identification element comprises an online model and an online learning mechanism, and wherein the system states observer comprises a system model, and wherein the drilling controller comprises a feedforward model compensation element and a feedback controller element;
generate, by the trajectory planning element, a smooth trajectory profile based, at least in part, on the command, wherein the smooth trajectory profile is expressed as a smooth function, and wherein the smooth trajectory profile drives the first controllable element from a first operating point to a second operating point without saturating the first controllable element, wherein the trajectory planning element accesses one or more operation parameters corresponding to the first controllable element to which the command is directed;
receive at the drilling controller the smooth trajectory profile, a first online system identification element output from the online system identification element and a first system states observer output from the system states observer, wherein the first online system identification output comprises an identified parametric value within the online model and wherein the first system states observer output comprises a system states estimation output from the system model, wherein the first system identification element output comprises a nonlinear friction torque on a drilling bit calculated by the first system identification element;
receive at the online system identification element, the system states observer and the drilling controller one or more first measurements from one or more downhole sensors, wherein the one or more first measurements correspond to at least one of one or more drilling parameters and one or more downhole conditions;
generate, by the drilling controller, a first control signal based, at least in part, on the smooth trajectory profile, the first system identification element output and the first system states observer output;
transmit, from the drilling controller, the first control signal to the first controllable element to change a drilling parameter of the drilling assembly, the online system identification element and the system states observer;
receive at the online system identification element and the system states observer the first control signal, wherein a second online system identification element output and a second system states observer output are based, at least in part, on one or more second measurements from the one or more downhole sensors, the first control signal and one or more models of the drilling assembly; and
generate, by the drilling controller, a second control signal based, at least in part, on the second identification element output, the second system states observer output and a subsequently generated trajectory profile for a second controllable element.

11. The apparatus of claim 10, wherein the identified parametric value comprises a frictional torque value that is based, at least in part, on at least one of the one or more first measurements and an estimated downhole condition value for the online model of the one or more models.

12. The apparatus claim 10, wherein the set of instructions further cause the processor to determine the estimated downhole condition value for the online model based, at least in part, on
the at least one of the one or more first measurements;
the first control signal; and
the frictional torque value.

13. The apparatus of claim 12, wherein the set of instructions that cause the processor to determine the estimated downhole condition value for the online model further cause the processor to adaptively choose one of a Kalman filter and a particle filter.

14. The apparatus of claim 10, wherein
the drilling assembly comprises
a drill string;
a top drive coupled to the drill string; and
the drill bit coupled to the drill string; and
the first controllable element comprises the top drive.

15. The apparatus of claim 14, wherein the set of instructions that cause the processor to generate the first control signal further cause the processor to receive
the smooth trajectory profile;
the frictional torque value;
an estimated downhole condition value; and
the one or more measurements.

16. The apparatus of claim 15, wherein the online model comprises a lumped mass model of the drilling assembly with masses corresponding to the top drive and the drill bit, and a torsional spring corresponding to the drill string.

17. The apparatus of claim 16, wherein the set of instructions that cause the processor to generate the first control signal based, at least in part, on the smooth trajectory profile, the frictional torque value, and the online model further cause the processor to determine a first motion profile for the drill bit to overcome frictional torque.

18. The apparatus of claim 17, wherein the set of instructions that cause the processor to generate the first control signal based, at least in part, on the smooth trajectory profile, the frictional torque value, and the online model of the drilling assembly further cause the processor to determine a drill string twist value for the drill string that produces the first motion profile;
determine a second motion profile for the top drive that produces the drill string twist value; and
determine a control signal to the top drive that produces the second motion profile.

19. A system for removal of stick-slip vibrations of a drilling assembly, comprising:
the drilling assembly including
a control system, wherein the control system comprises a trajectory planning element, a drilling controller, a system identification element, an online system identification element and a system states observer, wherein the system identification element comprises an online model and an online learning mechanism, and wherein the system states observer comprises a system model;
a drill string;
a top drive coupled to the drill string; and
a drill bit coupled to the drill string; and
an information handling system communicably coupled to the top drive that includes a processor and a memory device coupled to the processor with a set of instructions that, when executed by the processor, cause the processor to
receive a command, at the control system, directed to the top drive;
generate, by the trajectory planning element, a smooth trajectory profile based, at least in part, on the command, wherein the smooth trajectory profile is expressed as a smooth profile, and wherein the smooth trajectory profile drives the top drive from a first operating point to a second operating point without saturating the top drive, and wherein the trajectory planning element accesses one or more operation parameters corresponding to the top drive to which the command is directed;
receive at the drilling controller the smooth trajectory profile, a first online system identification element output from the online system identification element and a first system states observer output from the system states observer, wherein the first online system identification output comprises an identified parametric value with the online model and wherein the first system states observer output comprises a system states estimation output from the system model, and wherein the drilling controller comprises a feedforward model compensation element and a feedback controller element;
receive at the online system identification element, the system states observer and the drilling controller one or more first measurements from one or more downhole sensors, wherein the one or more first measurements correspond to at least one of one or more drilling parameters and one or more downhole conditions;
generate, by the drilling controller, a first control signal to the top drive based, at least in part, on the smooth trajectory profile, the first system identification element output and the first system states observer output; and
transmit, from the drilling controller, the first control signal to the top drive to change a drilling parameter of the drilling assembly, the online system identification element and the system states observer;
receive at the online system identification element and the system states observer the first control signal, wherein a second online system identification element output and a second system states observer output are based, at least in part, on one or more second measurements from the one or more downhole sensors, the first control signal and one or more models of the drilling assembly; and
generate, by the drilling controller, a second control signal based, at least in part, on the second identification element output, the second system states observer output and a subsequently generated trajectory profile for a controllable element, wherein the controllable element is different from the top drive.

20. The system of claim 19, wherein the set of instructions that cause the processor to generate the first control signal further cause the processor to:
determine a first motion profile for the drill bit to overcome a frictional torque;
determine a drill string twist value for the drill string that produces the first motion profile;
determine a second motion profile for the top drive that produces the drill string twist value; and
determine the control signal that produces the second motion profile.

* * * * *